(12) United States Patent
Cerne

(10) Patent No.: US 8,408,499 B2
(45) Date of Patent: Apr. 2, 2013

(54) AIRCRAFT

(75) Inventor: Gerd Cerne, Meersburg (DE)

(73) Assignee: Airbus Operations GmbH, Hamburg (DE)

( * ) Notice: Subject to any disclaimer, the term of this patent is extended or adjusted under 35 U.S.C. 154(b) by 414 days.

(21) Appl. No.: 12/595,886

(22) PCT Filed: Apr. 24, 2008

(86) PCT No.: PCT/EP2008/054985
§ 371 (c)(1),
(2), (4) Date: Dec. 14, 2009

(87) PCT Pub. No.: WO2008/129074
PCT Pub. Date: Oct. 30, 2008

(65) Prior Publication Data
US 2010/0116928 A1    May 13, 2010

Related U.S. Application Data

(60) Provisional application No. 60/926,067, filed on Apr. 24, 2007.

(51) Int. Cl.
*B64C 3/58* (2006.01)
(52) U.S. Cl. .................................. 244/213; 244/214
(58) Field of Classification Search ................. 244/213, 244/76 A, 130, 123.1, 102 R, 214, 217, 99.3; 29/897.2; 701/4
See application file for complete search history.

(56) References Cited

U.S. PATENT DOCUMENTS

| | | | | |
|---|---|---|---|---|
| 2,246,116 A | * | 6/1941 | Wagner et al. | 244/216 |
| 2,284,519 A | * | 5/1942 | Hall | 244/216 |
| 2,524,605 A | | 10/1950 | Servanty | |
| 4,498,647 A | * | 2/1985 | Boehringer et al. | 244/99.3 |
| 4,614,320 A | * | 9/1986 | Rutan | 244/216 |
| 4,784,355 A | | 11/1988 | Brine | |
| 2002/0047068 A1 | | 4/2002 | Uchida et al. | |

FOREIGN PATENT DOCUMENTS

| | | |
|---|---|---|
| GB | 559546 | 2/1944 |
| WO | WO 98/23483 | 6/1998 |

* cited by examiner

*Primary Examiner* — Christopher P Ellis
*Assistant Examiner* — Medhat Badawi
(74) *Attorney, Agent, or Firm* — Greer, Burns & Crain Ltd.

(57) ABSTRACT

The invention provides according to one aspect an aircraft, comprising a fuselage, an airfoil mounted to the fuselage and a flap for steering the aircraft. Furthermore, connecting means articularly connect the flap to the airfoil such that the flap is allowed to rotate around a rotation axis substantial parallel to the trailing or leading edge of the airfoil between a retracted position and an extended position and to translate in a direction substantially parallel to the rotation axis. A rod articularly connect the flap to the airfoil or to the fuselage, wherein the rod defines the translation of the flap in the direction parallel to the rotation axis. Hence, by way of one aspect of the invention, forces acting of the flap in a direction parallel to the rotation axis can be taken up by the rod. Consequently, there is no need for using locating bearings having negative aerodynamic effects due to their by comparison large dimensions in a direction substantially perpendicular to the direction of flight of the aircraft.

24 Claims, 13 Drawing Sheets

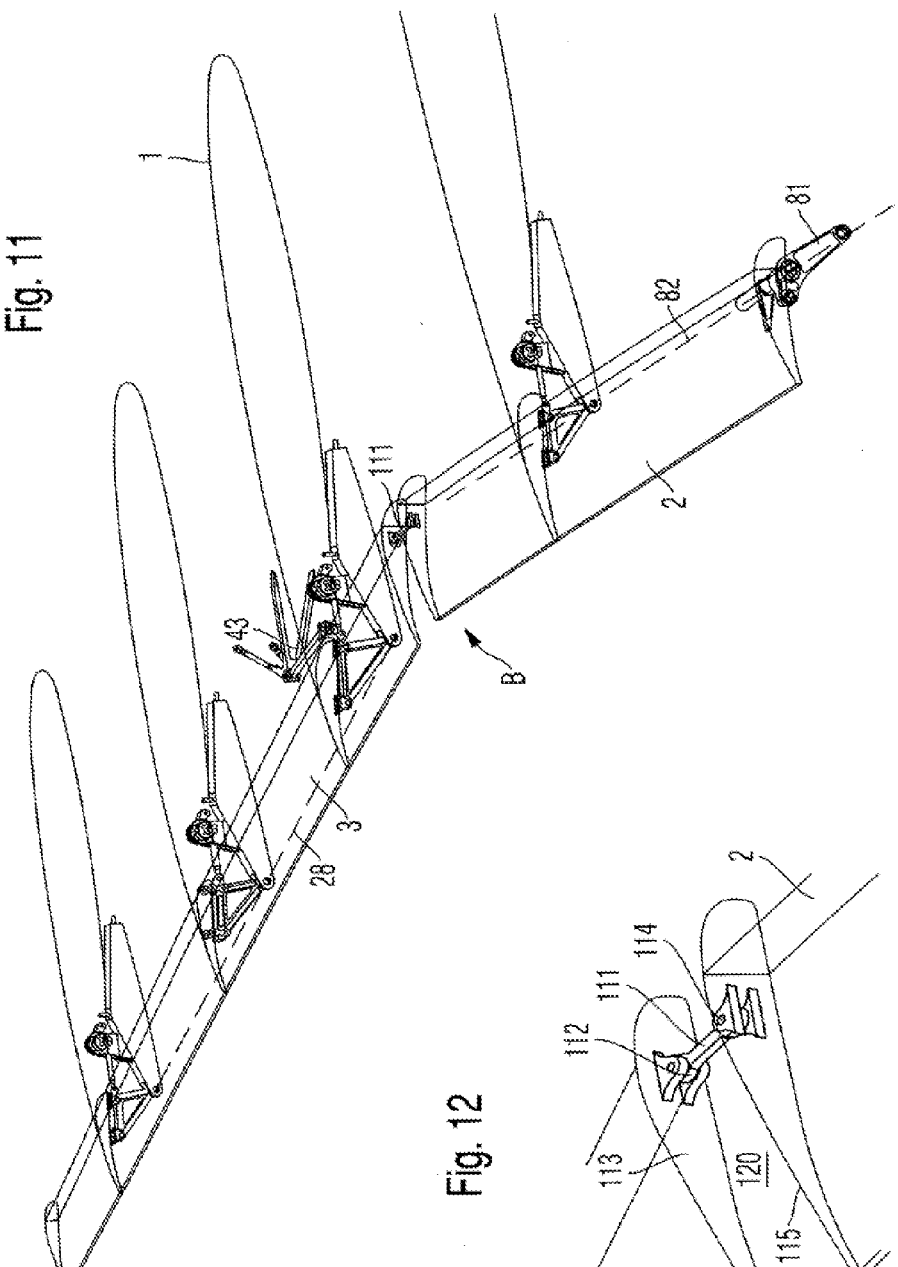
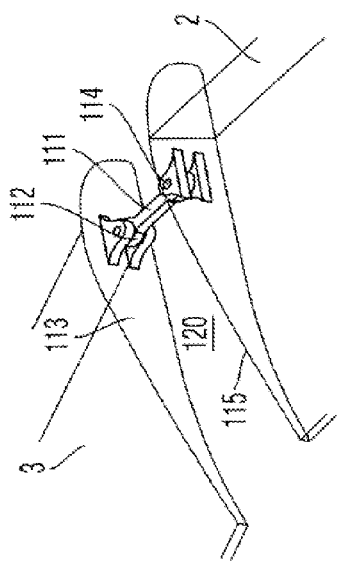

AIRCRAFT

CROSS-REFERENCE TO RELATED APPLICATIONS

This application claims the benefit of U.S. Provisional Application No. 60/926,067, filed Apr. 24, 2007, the entire disclosure of which are herein incorporated by reference.

FIELD OF THE INVENTION

The present invention relates to an aircraft.

BACKGROUND OF THE INVENTION

Although useable in any aircraft, the present invention and the problem on which it is based are explained in more detail with reference to an aeroplane.

Most aeroplanes have one or more landing flaps attached to their wings. A landing flap has a retracted position in which it is stowed away under the wing and an extended position in which it is bent down into the air flow to produce extra lift on the aeroplane. The flap is rotated between the retracted position and the extended position around a rotation axis which runs substantially parallel to the trailing edge of the wing. Generally the rotation axis is defined by a number of bearings articularly connecting the flap to the wing. The bearings are usually arranged in fairings underneath the wing. Due to aerodynamic loads and other forces acting laterally, i.e. substantially away from or towards the fuselage of the aeroplane, on the flap, commonly one of the bearings is configured to be a locating bearing, whereas the other bearings are configured to be non-locating bearings. The locating bearing prevents a movement of the flap relative to the wing in the lateral direction.

Such a locating bearing needs to take up high bending moments. Therefore, it has to be sized comparatively large which also causes its fairing to be comparatively large in the lateral direction of the wing. This increases the aerodynamic drag on the aeroplane. This in turn has a number of negative effects such as e.g. an increased fuel consumption of the aeroplane.

SUMMARY OF THE INVENTION

It is therefore one object of the present invention to provide an aircraft, wherein the drag produced by the comparatively large fairings of the locating bearings can be reduced.

Accordingly, an aircraft is provided comprising a fuselage, an airfoil mounted to the fuselage and a flap for steering the aircraft. Connecting means articularly connect the flap to the airfoil such that the flap is allowed to rotate around a rotation axis substantially parallel to the trailing or leading edge of the airfoil between a retracted position and an extended position and to translate in a direction substantially parallel to the rotation axis. A rod articularly connects the flap to the airfoil or to the fuselage, wherein the rod defines the translation of the flap in the direction substantially parallel to the rotation axis.

The idea on which the present invention is based is to provide connecting means allowing a rotation of the flap relative to the airfoil and a rod defining the translation of the flap in the direction parallel to the rotation axis, wherein the connecting means and the rod are spatially separated. Thus, the rod takes up the loads acting substantially in the direction parallel to the rotation axis, i.e. for example the lateral direction of the flap as previously described. Hence, substantially no bending moments are generated in the connecting means, and they can therefore be sized smaller. This in turn reduces the size of the fairings, in which the connecting means are preferably arranged. Thus, the aerodynamic drag of the aircraft is reduced, which in turn results in a reduced fuel consumption of the aircraft.

In the present invention "translation" refers to a movement of the flap in the direction substantially parallel to the rotation axis. The "translation of the flap" can also merely refer to a component movement of the flap. For instance, the flap can have another component movement in a direction radial with respect to the rotation axis.

For the purpose of the present invention, a "rod" refers to a rigid link. Preferably the rigid link has a longish shape with a cross section that is more or less constant along the length of the link.

According to the present invention, "the rod defines the translation" is to say that the rod prevents the flap from translating under internal loads, such as a flap actuator acting on the flap, and external loads, such as aerodynamic loads acting on the flap, at any position of the flap between (and including) the retracted position and the extended position. Furthermore, in the present invention, "the rod defines the translation" is to say that the rod controls the translation of the flap between any two instances as the flap rotates between (and also including) its retracted position and its extended position to be zero, meaning effectively no translation, or in the range of a couple of millimeters or centimeters.

According to a preferred embodiment of the invention, the rod is configured such that the flap translates in the direction parallel to the rotation axis as the flap is rotated between its retracted position and its extended position. Hence, the rod does not only prevent the flap from moving in the direction parallel to the rotation axis under internal loads or external loads but also causes the flap to have a non-zero translation as the flap is rotated between its retracted and extended position. For instance, by way of this embodiment, the movement of an outer flap relative to an inner flap of an aeroplane, which are arranged adjacently to one another, can be steered by the rod. Thereby, the inner and outer flap can be prevented from colliding in their extended positions respectively, since the rod can be configured to move the outer flap away from the inner flap as both flaps are rotated from the retracted position into the extended position. A further advantage of this embodiment is that an actuator actuating the flap between the retracted position and the extended position can be arranged such that it extends essentially in the direction of flight even in cases of swept trailing or leading edges. This will become more clear from the description of the figures.

According to a preferred embodiment, the rod extends substantially parallel to the rotation axis in the retracted position of the flap and forms an angle with the rotation axis in the extended position. Therefore, the rod pulls the flap parallel to the rotation axis towards the point of connection of the rod to the airfoil as the flap rotates about the rotation axis.

According to a further preferred embodiment, the rod has an articular joint connecting it the leading edge or one of the sides of the flap at its one end and an articular joint connecting it to the airfoil or the fuselage at its other end. In the present invention, "an articular joint" refers to a joint providing at least two, preferably three rotational degrees of freedom. The articular joint can be for example configured to be a ball joint. In cases where the flap is a flap with its one end adjacent to the fuselage, it is convenient to attach the other end of the rod to the fuselage. For geometrical reasons, it is, in this case, also practical to attach the one end of the rod to the side of the flap adjacent to fuselage by means of the articular joint.

According to a further preferred embodiment, the articular joint at the other end of the rod connecting the rod to the airfoil is fixedly attached to the rear spar or front spar of the airfoil by means of a plurality of struts, preferably four struts. This results in a very rigid and lightweight structure, wherein the loads from the rod are transmitted to the rear or front spar in a distributed manner.

Preferably adjacent struts are arranged in a V-shape. This improves load distribution even more.

According to a further preferred embodiment, the connecting means comprise at least two levers spaced apart from each other along the rotation axis and articularly connecting the flap with the airfoil and/or the fuselage. In this manner, the rotatability of the flap around the rotation axis is provided, while the flap is maintained in a position essentially parallel to the rotation axis. This also includes arrangements, wherein the two levers have different lengths, thus resulting in a slightly skew arrangement of the flap relative to the rotation axis.

According to a further preferred embodiment at least one of the levers is triangular in shape having an articular joint at its one corner connecting it to the airfoil and a hinge joint along the side opposing the articular joint connecting it to the flap. In the present invention "a hinge joint" refers to a joint having preferably a single degree of freedom only. The single degree of freedom can, for instance, be provided by means of a pin hinging in a bushing. This arrangement provides high rigidity at low weight.

According to a further preferred embodiment of the invention, at least one of the levers has an articular joint to the fuselage at its one end and an articular joint to a trunnion fixed to the flap at its other end, wherein the trunnion is non-rotatably fixed to the lever in a plane substantially perpendicular to the rotation axis. This type of lever—just like the triangular lever referred to above—allows a rotation of the flap around the rotation axis and a translation of the flap substantially parallel to the rotation axis. Having the lever non-rotatably coupled to the trunnion makes it possible to transmit a rotational moment from the lever to the trunnion. However, forces in the direction along the trunnion cannot be transmitted between the lever and the trunnion.

According to a further preferred embodiment of the invention, the rod has an articular joint connecting it to the trunnion of the flap at its one end and an articular joint connecting it to the fuselage at its other end. Hence, by way of this embodiment, the trunnion has a dual function: it serves as a connection point for the rod as well as hinge point for the lever. Thus, the number of parts can be reduced.

According to a further preferred embodiment, the airfoil has at least one support beam attached to it, wherein an end section of the support beam extends away from the airfoil, wherein at least one of the levers has an articular joint connecting it to the end section. The support beam is typically arranged underneath the airfoil. Thus, the rotation axis can be provided a distance apart from the airfoil. This allows the flap to be rotated so as to increase the total lift surface.

According to a further embodiment of the invention, the at least one support beam extends in the direction of flight of the aircraft. This reduces the drag on the aircraft.

According to a further preferred embodiment of the invention, the airfoil has for at least part of its length a trailing or leading edge extending at an angle not equal to 90° with respect to the direction of flight. This is also referred to as a "swept wing" and improves the aerodynamic performance of the airfoil.

According to a further preferred embodiment, an actuator is mounted to the support beam, the actuator having a linkage connected to the flap, the linkage being extendible substantially in the plane of the support beam to operate the flap between its retracted position and its extended position. This allows a fairing covering the support beam to be dimensioned comparatively small in a direction perpendicular to the direction of flight. Again, this reduces drag.

According to a further preferred embodiment, the actuator is configured as a spindle drive or a lever arm drive. These are well suited to be mounted on support beams with fairings having small dimensions in a direction perpendicular to the direction of flight.

According to a further preferred embodiment of the invention, the aircraft comprises an additional flap adjacent to the flap, wherein the additional flap has additional connecting means articularly connecting the additional flap to the airfoil such that the additional flap is allowed to rotate around a rotation axis substantially parallel to the trailing or leading edge of the airfoil between a retracted position and an extended position and to translate in a direction parallel to the rotation axis. What has been said with regard to the kinematics of the flap also applies to the additional flap. In lager aircraft, it is useful to have multiple flaps on each airfoil.

According to a further preferred embodiment, the flap or the additional flap extends at least partially along the part of the airfoil having a trailing or leading edge extending at an angle not equal to 90° with respect to the direction of flight. Hence, one flap can be an inner flap extending in a direction essentially perpendicular to the direction of flight and the other flap can be outer flap adjacent to the inner flap extending along the airfoil at an angle not equal to 90° with respect to the direction of flight.

According to a further preferred embodiment, the flap and the additional flap are articulately connected to each other at adjacent ends by means of an additional rod. In this manner, the translational force effected by the rod on one of the flaps can be transmitted by means of the additional rod from the flap connected by means of the rod to the airfoil or to the fuselage to the other flap not being connected to the airfoil or to the fuselage by means of the rod. Consequently, both flaps move under the action of the rod in a direction parallel to their respective axis of rotation.

According to a further preferred embodiment, the flap and the additional flap form a gap between them in their extended positions, wherein the gap is closed by means of a sealing, wherein the sealing has a first component attached to one flap and a second component attached to the other flap, wherein preferably the first and second component are in sliding contact when the flaps are operated between their retracted and extended positions. The sealing has a positive aerodynamic effect on the gap, since vortices resulting from the gap can be prevented. Furthermore, by way of this embodiment, the gap is closed not only in a situation, wherein both flaps are fully extended, but also in a situation, wherein one of the flaps is only partially extended.

According to a further preferred embodiment, the first component is made of a flexible material and the second component is made of a stiff material. Even more preferably, the flexible material is also elastic. By way of this embodiment, a tight seal is achieved, wherein the first component is elastically urged against the second component.

According to a further preferred embodiment, the sides of the adjacent ends of the flaps and/or the sealing has an aperture for the additional rod to pass through to articulately connect the flap and the additional flap. Having the additional rod integrated in the two flaps results in a favourable flow of forces and avoids negative aerodynamic effects that a rod outside the flaps might have.

According to a further preferred embodiment, the airfoil is a wing, vertical tail plane or horizontal tail plane. Generally, all of these incorporate flaps rotating about some axis, which need to be translationally located in a direction parallel to or coaxial with the rotation axis. Hence, the invention is well suited but not limited to all of these.

According to a further preferred embodiment, the flap is a fore flap or an aft flap, in particular a landing flap. In the present invention, "flap" is to include all sorts of slats or rudders. The flap is used for steering the aircraft, which is to include but not limited to changing the direction of flight, braking and/or increasing the aerodynamic lift.

BRIEF DESCRIPTION OF THE DRAWINGS

The invention is further described by way of example with reference to the accompanying figures, in which:

FIG. 11 shows a perspective partial view from FIG. 2, illustrating an additional rod connecting two flaps according to a further preferred embodiment of the present invention;

FIG. 12 shows a detailed view B from FIG. 11;

DETAILED DESCRIPTION OF THE DRAWINGS

In the figures, the same reference numbers refer to the same or functionally equivalent components unless otherwise stated.

Figure 1:
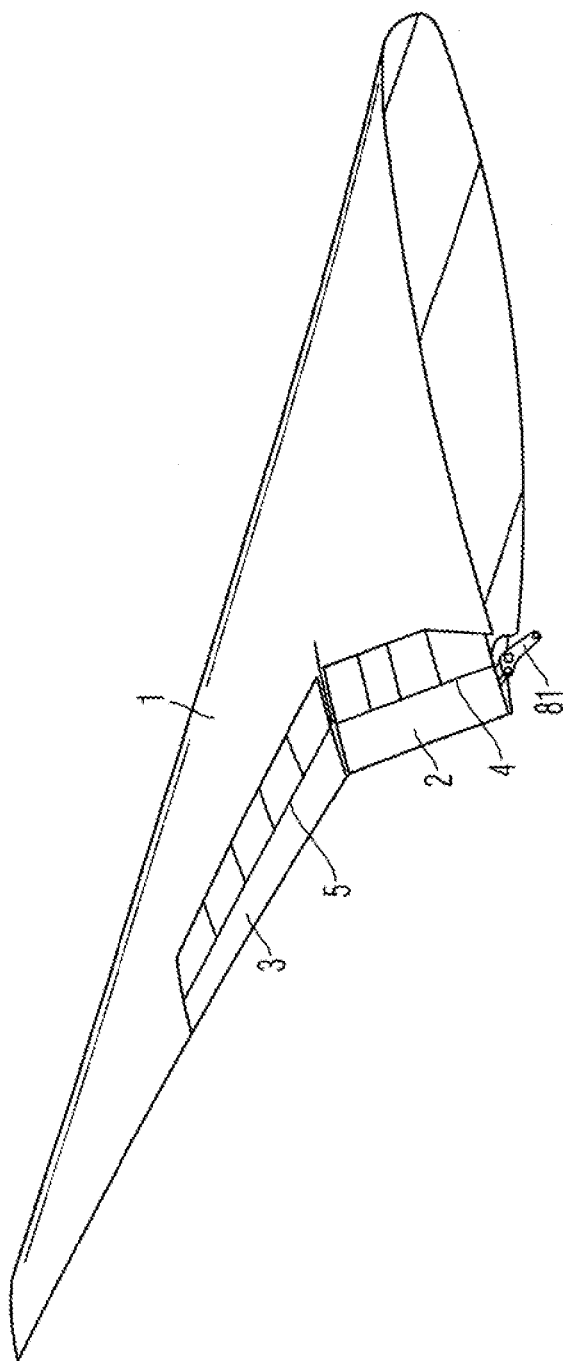
FIG. 1 shows a perspective view of a wing according to a preferred embodiment of the invention.

FIG. 1 shows a wing 1 of an aeroplane according to a first preferred exemplary embodiment of the invention.

The wing 1 has an inner flap 2 and an outer flap 3 arranged adjacently to the inner flap 2 mounted to it at its trailing edge 4 and 5, respectively. The inner flap 2 and the outer flap 3 are in their retracted positions I as shown in FIG. 1. Furthermore, FIG. 1 shows a lever 81 allowing a rotation of the inner flap 2 from its retracted position into its extended position as will be explained at a later stage hereinafter.

Figure 2:
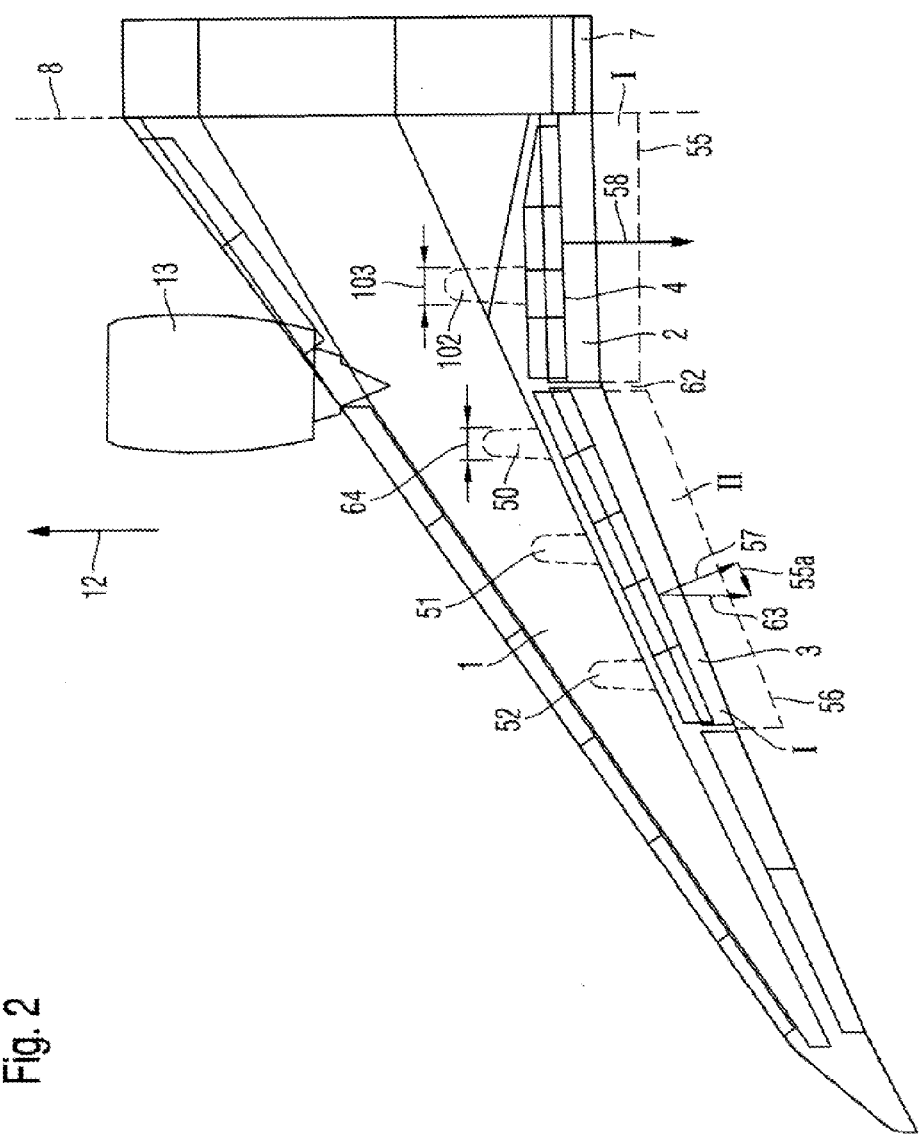
FIG. 2 shows the wing of FIG. 1 in a top view.

FIG. 2 shows a top view from FIG. 1 and includes a section of the fuselage 8 of the aeroplane.

The wing 1 is mounted to a support beam 7 of the fuselage 8 indicated by broken lines. The direction of flight of the aeroplane is indicated by the arrow 12. The wing 1 is of the "swept type", wherein the trailing edge 4 extends perpendicularly with respect to the direction of flight 12 and the trailing edge 5 forms an angle larger than 90° with the direction of flight 12. The wing 1 has an engine 13 mounted to it which thrusts the aeroplane in the direction of flight 12.

Figure 3:
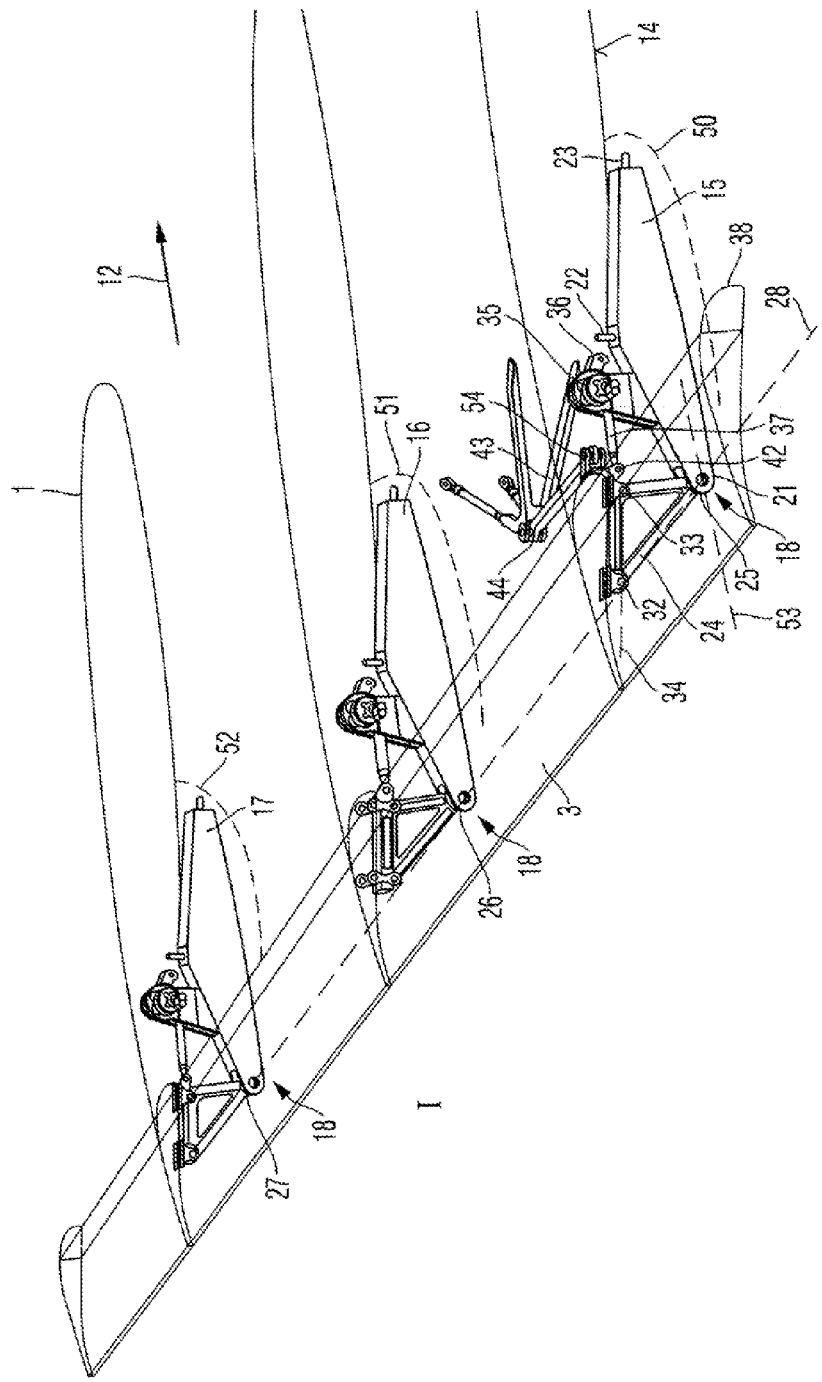
FIG. 3 shows a partial view of the wing from FIG. 2 illustrating connecting means and a rod, wherein an outer flap of the wing is in its retracted position.
Figure 4:
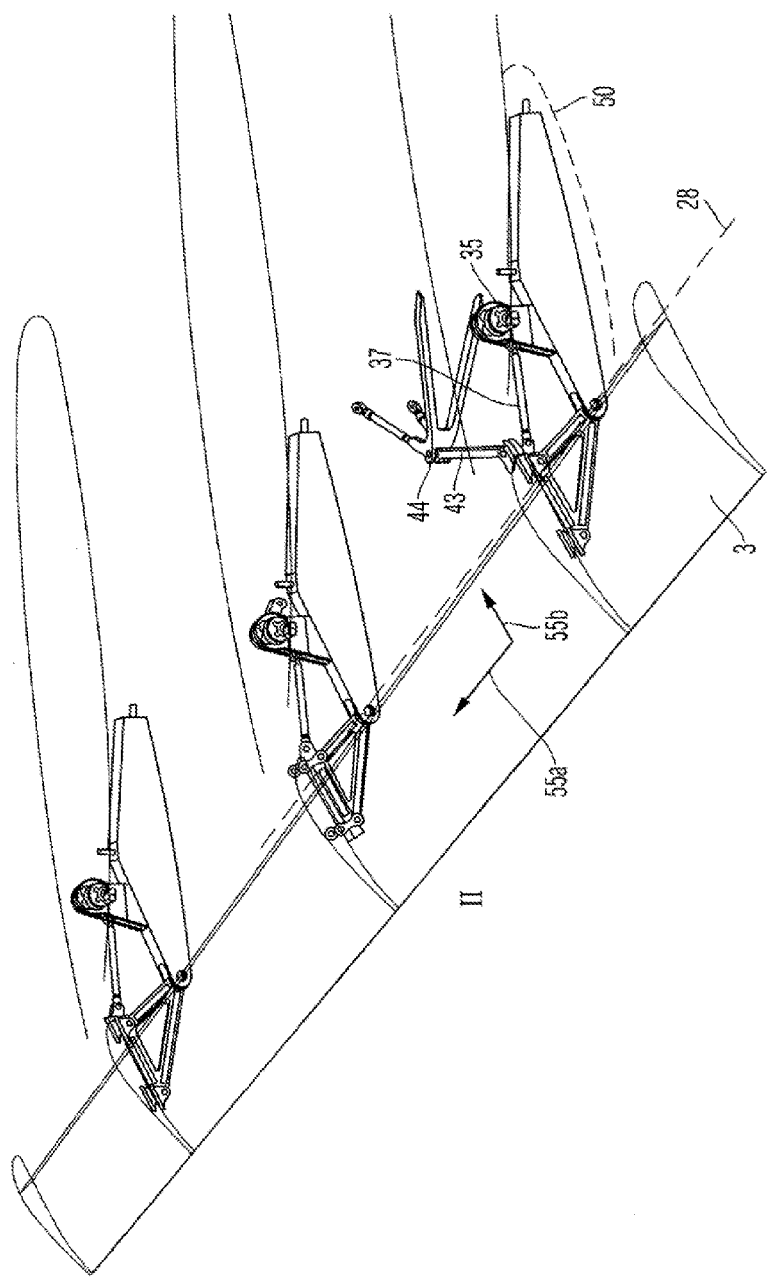
FIG. 4 shows the view from FIG. 3, wherein the outer flap is in its extended position.
Figure 5:
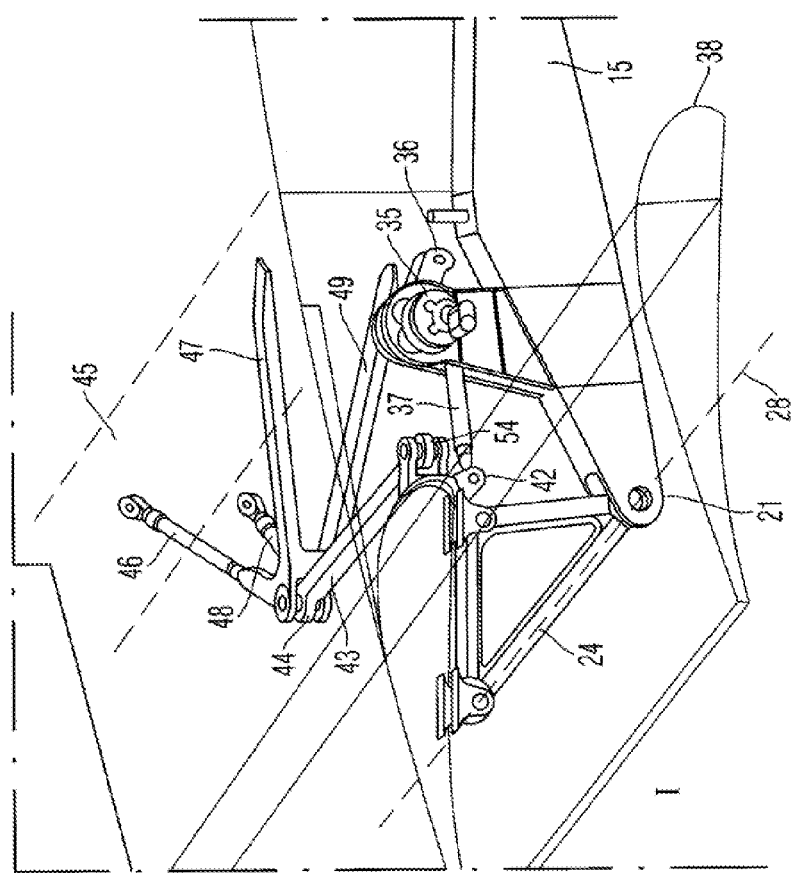
FIG. 5 shows the connection means and the rod of FIG. 3 in an enlarged view.

In connection with FIGS. 3 to 5, the way in which the outer flap 3 is mounted to the wing 1 will be explained in more detail. In FIG. 3, the wing 1 and the outer flap 3 are indicated schematically by lines showing their profiles respectively.

According to the present exemplary embodiment, there are three support beams 15, 16 and 17 attached to the lower surface 14 of the wing 1. Each of the support beams 15, 16 and 17 extends in the direction of flight 12.

Further, each support beam 15, 16, 17 (in the following exemplified for the support beam 15) has an end section 21 extending from the wing 1 towards the outer flap 3 and away from the lower surface 14 of the wing 1. The support beam 15 is attached to the wing 1 by means of fittings 22 and 23.

The outer flap 3 is articularly connected to the support beam 15 by means of connecting means 18. The connecting means 18 comprise a lever 24 which is triangular in shape. At its one corner, the lever 24 has a ball joint 25 connecting it to the end section 21 of the support beam 15. The ball joint 25 defines together with corresponding ball joints 26 and 27 of the support beam 16 and 17, respectively, a rotation axis 28 of the outer flap 3. The rotation axis 28 extends substantially parallel to the trailing edge 5 of the wing 1 associated with the outer flap 3. Along its side opposing the ball joint 25, the lever 24 has hinge joints 32 and 33 defining a hinge axis 34 about which the lever 24 can rotate with respect to the outer flap 3.

Furthermore, the support beam 15 has an actuator 35 mounted to it which is configured to rotate an arm 36 back and forth substantially in the plane (see reference numeral 107 in FIG. 9) of the support beam 15. The arm 36 is articularly connected to one end of a rod 37. The other end of the rod 37 is articularly connected to the leading edge 38 of the outer flap 3 by means of a ball joint 42. This is best seen in FIG. 5. The rod 37 is also configured to move substantially in the plane 107 of the support beam 15.

Moreover, the aeroplane has a rod 43 which is at its one end articularly connected by means of a ball joint 44 to the rear spar 45 (schematically indicated by broken lines in FIG. 5) of the wing 1. For this purpose, the wing 1 has four struts 46, 47, 48 and 49 which each hold the ball joint 44 at their one end. The struts 46, 47, 48 and 49 are arranged in a V-shape with respect to one another such that each of them has its individual connecting point at its other end to the rear spar 45. At its other end, the rod 43 is connected by means of a ball joint 54 to the leading edge 38 of the outer flap 3.

Each support beam 15, 16 and 17 as well as the arm 36, the rod 37 and the actuator 35 associated with each support beam 15, 16, and 17 are covered in fairings 50, 51 and 52 underneath the wing 1 in order to reduce aerodynamic drag.

Having elaborated on the design of this exemplary embodiment of an aircraft, the working principle will be explained in the following:

As the actuator 35 operates the arm 36 and rod 37 back and forth, the outer flap 3 is rotated between its retracted position I (see FIG. 3) and its extended position II (see FIG. 4) about the rotation axis 28. As can be seen in FIG. 3, the rod 43 extends approximately parallel to the rotation axis 28 in the retracted position I of the outer flap 3. In the extended position II of the outer flap 3, the rod 43 pivots around the ball joint 44 and thus forms an angle with the rotation axis 28. The result of this being that the outer flap 3 translates in a direction indicated by the arrow 55a (see FIG. 4) parallel to the rotation axis 28 as the outer flap 3 is rotated from its retracted position I to its extended position II. At all times, be it in the retracted position I or in the extended position II or in a position between the extended position II and the retracted position I, the outer flap 3 is prevented from moving in the direction 55*a* parallel to the rotation axis 28, be it under an internal load, for example due to the load exerted by the rod 37 of the actuator 35 on the outer flap 3 or be it an external load, for instance aerodynamic loads acting on the outer flap 3 in a direction parallel to the rotation axis 28. Hence, the ball joints 25, 26 and 27 do not need to take up any loads in the direction 55*a* parallel to the rotation axis 28 and, thus, the outer flap 3 is securely located in that direction 55*a*. By means of the rod 37 the ball joints 25, 26 and 27 can be configured to be non-locating bearings which therefore have smaller dimensions than locating bearings. Hence, the fairings 50, 51 and 52 can be dimensioned with a smaller width 64 in a direction perpendicular to the direction of flight 12. Hence, the drag of the aeroplane is reduced.

In FIG. 2 the extended positions of the inner flap 2 and the outer flap 3 are indicated in broken lines having reference numerals 55 and 56, respectively. The direction of movement of each flap 2, 3 from the retracted to the extended position I, II without the action of the rod 43 is indicated by the arrows 57 and 58 with respect to the trailing edges 4 and 5 of the wing 1 respectively. If the inner and outer flap 2, 3 are to be arranged close to one another in the retracted position as shown in FIG. 2 (this is desirable in many instances) and the inner and outer flap 2, 3 were simply rotated about their respective rotation axis 28, this would result in a collision of the inner flap 2 and the outer flap 3 in an area designated 62. However, due to the action of the rod 43 on the outer flap 3, the same is moved translationally in the direction of the arrow 55*a* as the outer flap 3 rotates from its retracted position I to its extended position II. The resulting motion of the outer flap 3 is indicated by the arrow 63 in the top view from FIG. 2. Hence, a collision of the outer flap 3 with the inner flap 2 in the collision zone 62 can be prevented effectively.

A further advantage lies in the fact that the rod 43 can be configured such that the resulting motion 63 is parallel to the plane 107 (see FIG. 9) of the support beam 15 (and also of course parallel to the plane of the support beams 16 and 17, but the explanation hereinafter will be in connection with the support beam 15). This can be achieved by configuring the rod 43 with an appropriate length and/or choosing its point of connection 44 to the wing 1 appropriately. The advantage provided is that the rod 37 and the arm 36 as well as the actuator 35 can be arranged in the plane 107 of the support beam 15, which allows the fairing 50 to be configured with a small width 64 in a direction perpendicular to the direction of flight 12. Hence, the drag of the aeroplane can be reduced even further.

It is, in the present embodiment, to be noted that as the rod 43 pulls the outer flap 3 in the direction of the arrow 55*a*, the hinges 32 and 33 rotate about an axis 53 substantially perpendicular to the axis 28, wherein the axis 53 rotates about the rotation axis 28. This results in the outer flap 3 having not only a translational component 55*a* parallel to the rotation axis 28 as it rotates about the axis 28 but also a radial component 55*b* towards the rotation axis 28.

It is understood that the connecting means 18 for articularly connecting the outer flap 3 to the wing 1 as well as the rod 43 could also be applied to the inner flap 2 in FIG. 2. It should also be understood that the outer flap 3 does not need to be arranged next to an inner flap 2 but can be arranged on its own on a wing 1. Furthermore, the outer flap 3 does not need to be arranged on a trailing edge 5 forming an angle unequal to 90° with the direction of flight 12. It can also be arranged on a trailing edge being substantially perpendicular to the direction of flight 12. Moreover, the inner flap 2 might just as well be arranged on a trailing edge forming an angle unequal to 90° with the direction of flight.

Hereafter, a further preferred embodiment of the invention is explained in connection with the FIGS. 6 to 8.

Connecting means 79 articularly connect the inner flap 2 to the wing 1 and the fuselage 8. The arrangement 80 substantially corresponds to the connecting means 18 associated with the support beam 15 in the embodiment described in the FIGS. 3 to 5. Hence, this will not be detailed any further. The arrangement 80 together with a lever 81 allows the inner flap 2 to be rotated about a rotation axis 82 between a retracted position I (see FIG. 6) and an extended position II (see FIG. 7). The rotation axis 82 is substantially parallel to the trailing edge 4 of the wing 1. In the present invention substantially parallel also preferably encompasses the case where the rotation axis 82 does not run exactly parallel to the trailing edge 4 of the wing 1 but wherein the lever 81 as well as the angles through which the lever 81 and the lever 24 of the arrangement 80 are such that the inner flap 2 remains effectively parallel to the trailing edge 4 of the wing 1.

The lever 81 is connected to the fuselage support beam 7 (only schematically indicated and also shown in FIG. 7) of the fuselage 8 at its one end by means of a ball joint. At its other end, the lever 81 has a round aperture 83 through which a trunnion 84 extends, wherein a ball joint connects the lever 81 to the trunnion 84. The trunnion 84 is fixedly attached to the side 85 of the inner flap 2 adjacent to the fuselage 8 of the aeroplane. For the purpose of fixation to the inner flap 2, the trunnion 84 has a nose 87 extending substantially perpendicular to the trunnion 84 inside the flap 2.

Figure 8:
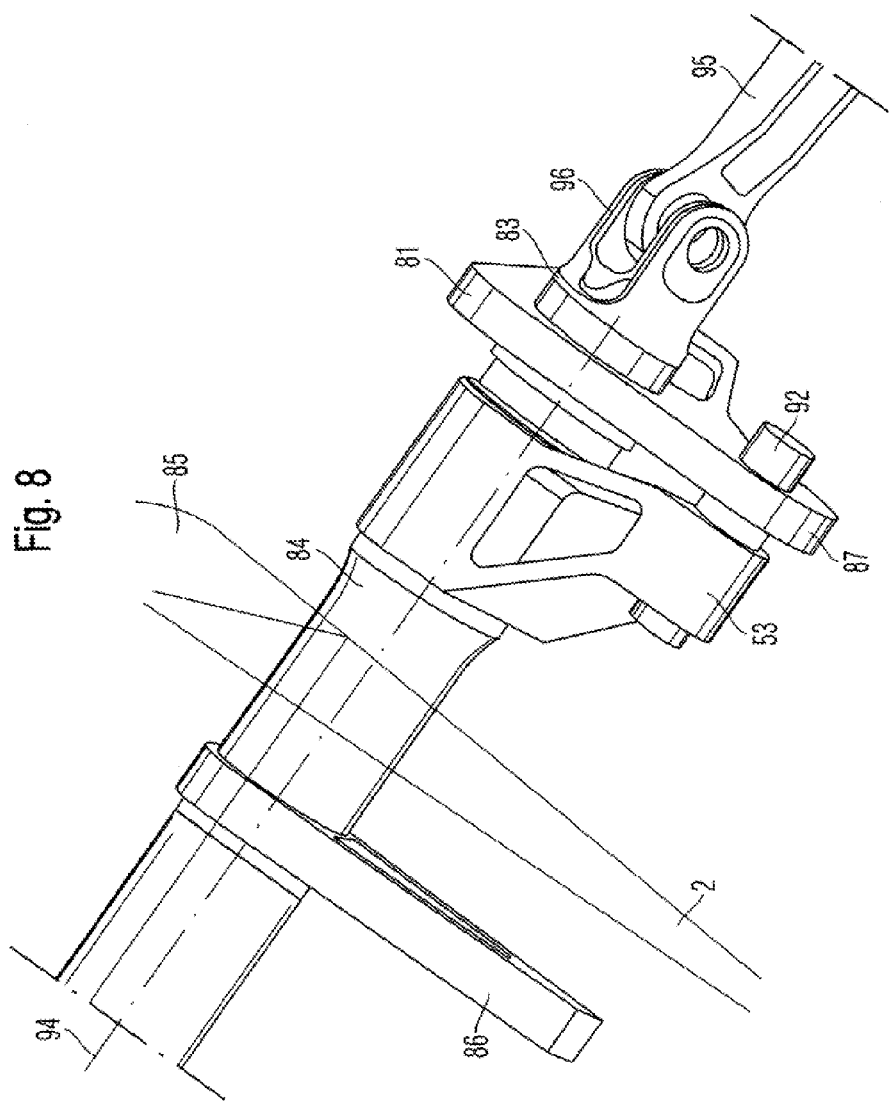
FIG. 8 shows a detailed view A from FIG. 7.

At its other end the lever 81 has a nose 87 (best seen in FIG. 8). The nose 87 of the lever 81 is non-rotatably coupled by means of a pin 92 to a corresponding nose 93 of the trunnion 84. The pin 92 is connected to the nose 87 by means of ball joint (not shown).

Hence, neither the arrangement 80 nor the lever 81 translationally locate the inner flap 2 in a direction parallel to the rotation axis 82. According to the present embodiment, this is achieved by a rod 95 connected to the end of the trunnion 84 by means of a ball joint 96 and coupled at its other end by means of a ball joint 97 to the fuselage support beam 7.

Figure 6:
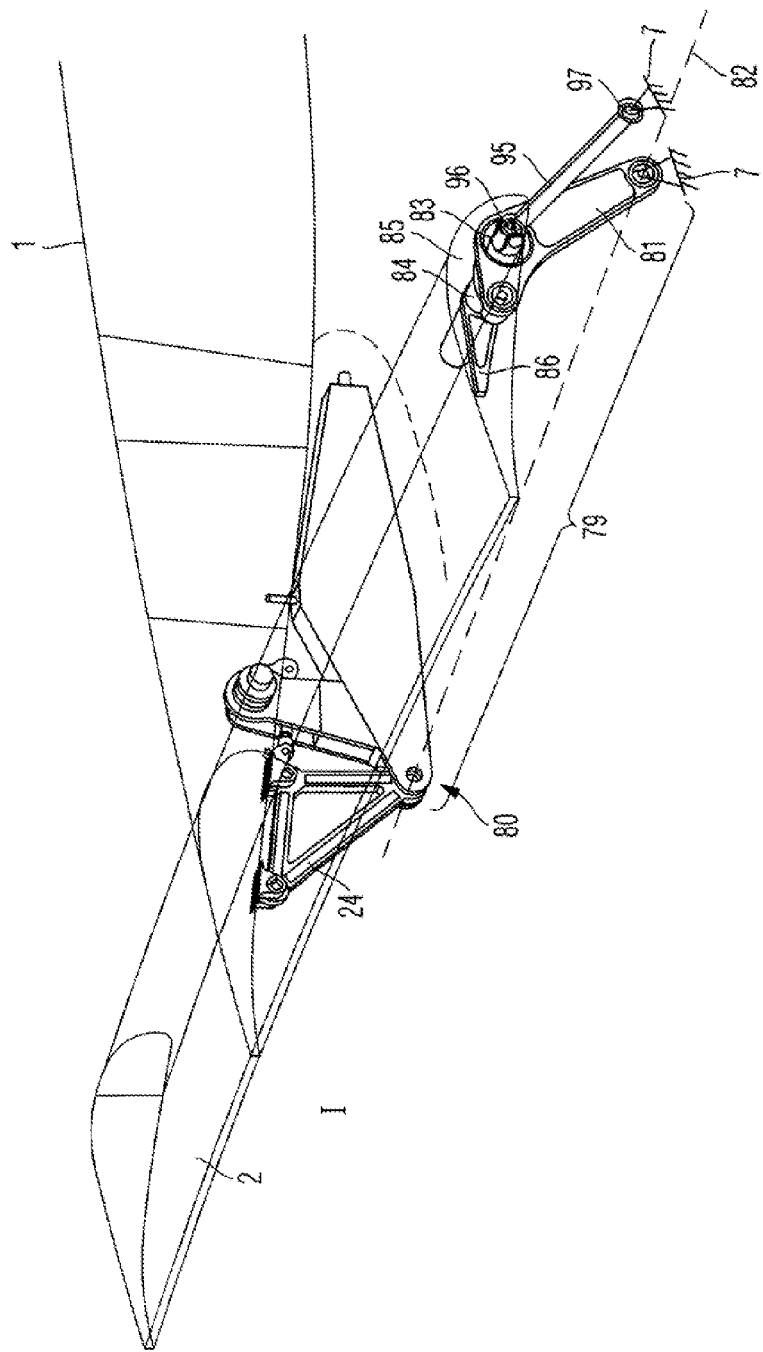
FIG. 6 shows a perspective partial view from FIG. 2 according to a further preferred embodiment of the invention, wherein an inner flap is in its retracted position.
Figure 7:
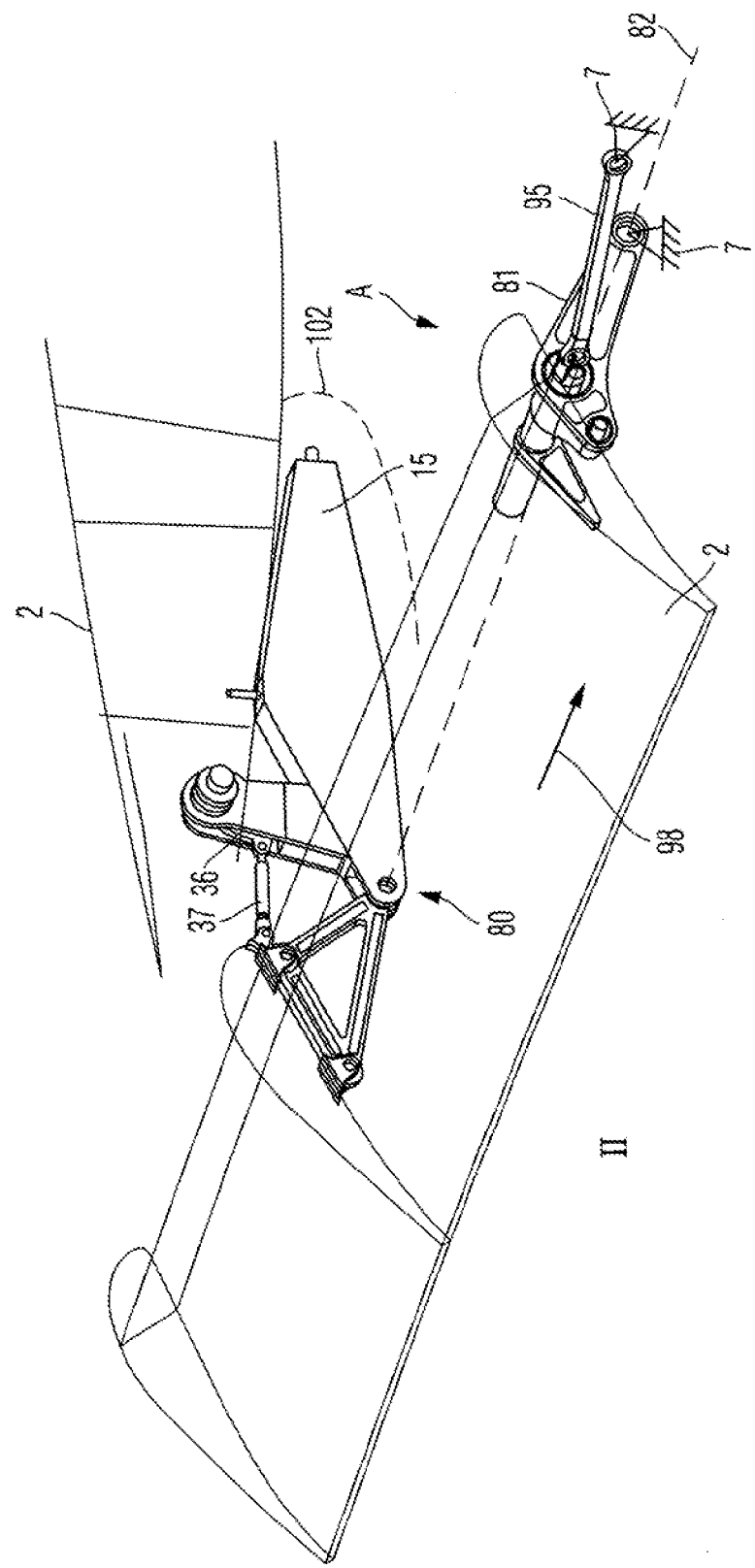
FIG. 7 shows the view from FIG. 6, wherein the inner flap is in its extended position.

The rod 95 is preferably configured such that the total translational movement 98 as the inner flap 2 is rotated from the retracted position I, shown in FIG. 6, to the extended position II, shown in FIG. 7, is substantially equal to zero. This is achieved by arranging the rod 95 such that it substantially extends in a direction parallel to the rotation axis 82 in a position of the inner flap 2 approximately half way between the fully extended and fully retracted position. This can be achieved by choosing the point of connection of the rod 95 to the fuselage support beam 7 appropriately. Consequently, the rod 37 and the arm 36 of the arrangement 80 can move substantially in the plane 107 (see FIG. 9) of the support beam 15. Hence, the fairing 102 (see FIG. 2) can be configured with a small width 103 in a direction substantially perpendicular to the direction of flight 12 of the aeroplane.

Figure 9:
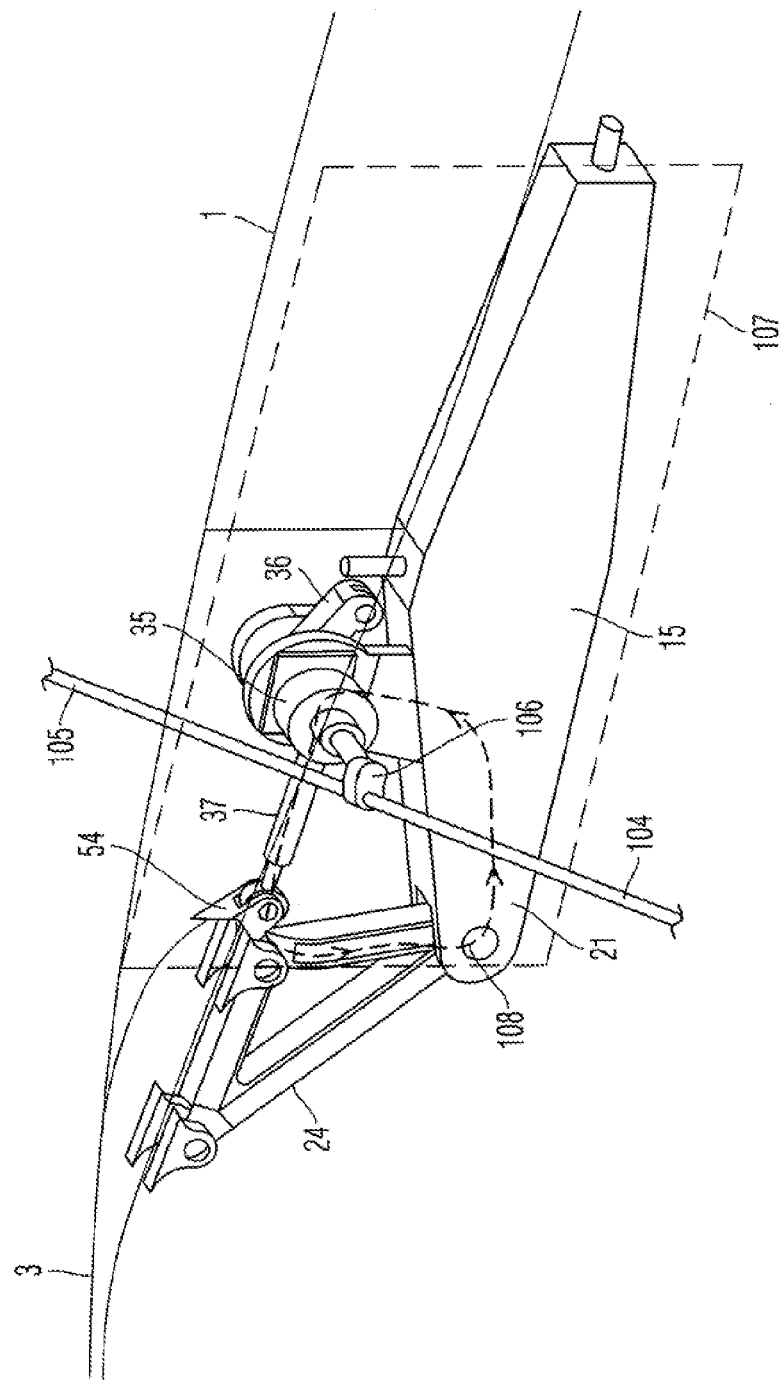
FIG. 9 shows a detailed view of an actuator illustrated in FIG. 3 or 6, wherein the flap is in its retracted position.
Figure 10:
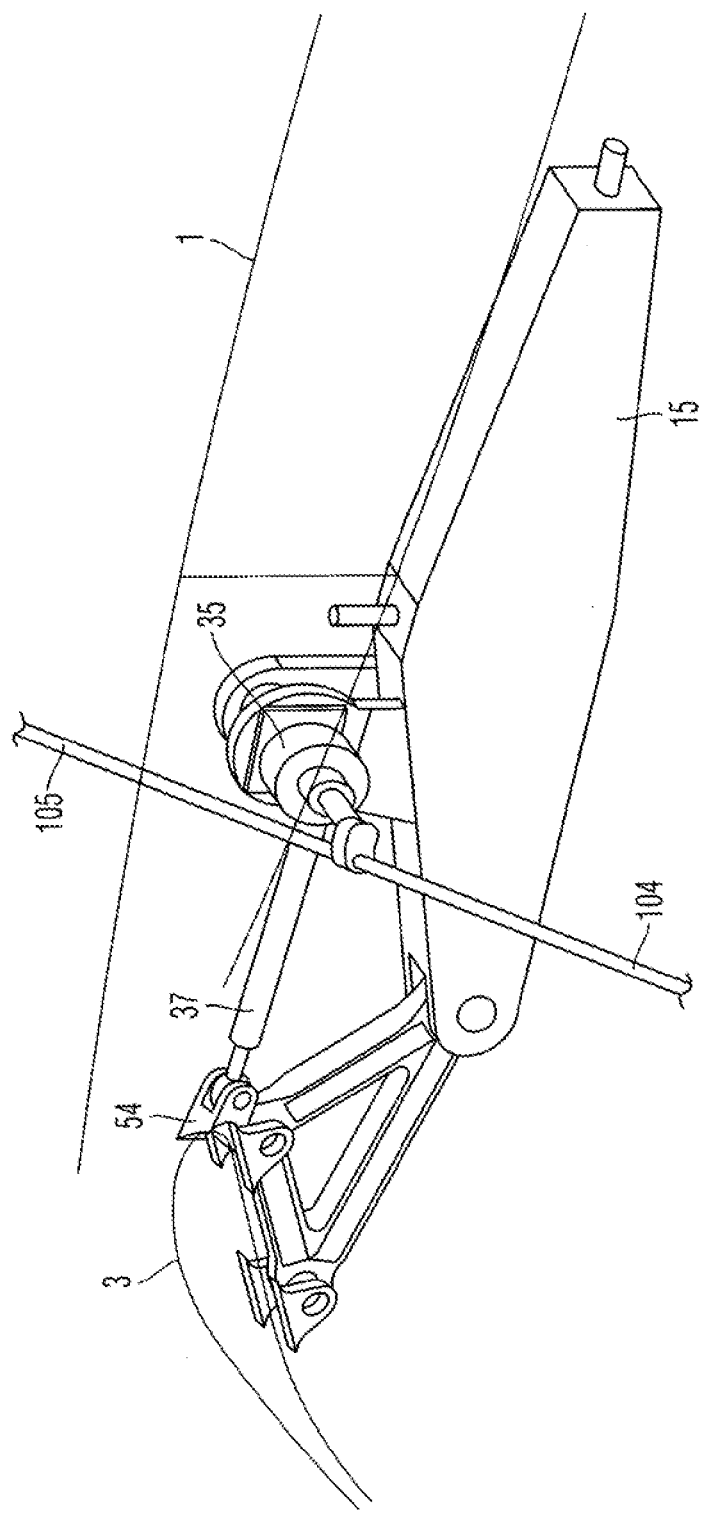
FIG. 10 shows the view from FIG. 9, wherein the flap is in its extended position.

FIGS. 9 and 10 show a detailed view of the actuator 35 and its associated linkages 36 and 37 in the retracted I and extended position II of the flap 3 according to another preferred embodiment of the invention. It should be understood that what is being said hereinafter also applies to the inner flap 2.

The actuator 35 is driven by a drive shaft 104 rotating about its own axis and being preferably driven by a drive unit located in the fuselage 8. The drive shaft 104 is connected to a drive shaft 105 that delivers torque to the actuator associated with the support beam 16. The drive shafts 104 and 105 extend substantially parallel to the trailing edge 5 of the wing 1. Torque is transmitted from the drive shaft 104 to the actuator 35 by means of a gear box 106.

The actuator 35 is mounted on the support beam 15. This results in a desirable, short flow of forces as indicated by the reference numeral 108 leading to a lightweight structure. This flow of forces 108 is shortened even further by having the actuator 35, the arm 36, the rod 37 and the support beam 15 aligned in one plane 107.

It is understood, that the embodiments of FIGS. 3 to 5 and 6 to 8 can be combined on a single wing 1, for example as shown in FIG. 2. Alternatively, the embodiments can also be used independently.

In connection with the FIGS. 11 and 12, a further preferred embodiment of the invention is explained.

In this embodiment, the embodiments of FIGS. 3 to 5 and 6 to 8 are combined. However, the rod 95 as shown in FIG. 7 is not part of the embodiment of FIG. 11. However, the rod 95 of FIG. 7 could be part of the embodiment of FIGS. 11 and 12, but then the rod 43 should be removed.

In the embodiment according to the FIGS. 11 and 12, the inner flap 2 is connected to the outer flap 3 by means of a rod 111. The rod 111 is coupled by means of a ball joint 112 to one end 113 of the outer flap 3 and is coupled by means of a ball joint 114 to an end 115 of the inner flap 2 adjacent to the end 113 of the outer flap 3.

The rod 111 couples the inner and outer flap 2, 3 translationally in a direction 55a, 98 parallel to their respective rotation axis 28, 82. Hence, by merely using the rod 43 articulately connecting the outer flap 3 to the wing 1, an undesired translational movement 55a of the outer flap 3 parallel to its rotational axis 28 and a movement of the inner flap 2 in a direction 98 parallel to the rotation axis 82 due to internal or external forces can be prevented. Obviously, the same effect can be achieved by using the rod 95 instead of the rod 43 as indicated in FIG. 7.

Figure 13:
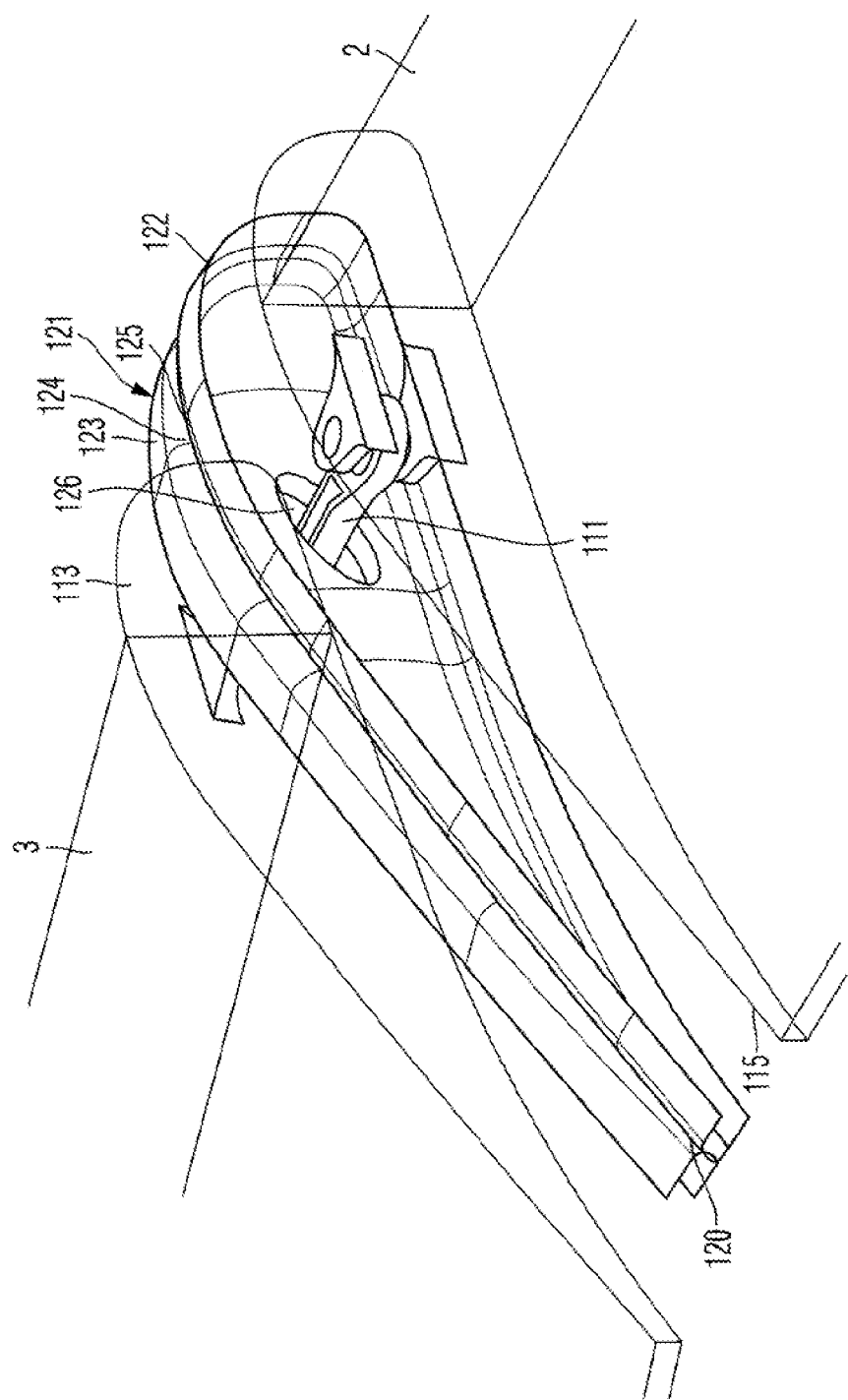
FIG. 13 shows a sealing between the two flaps as seen in FIG. 12.
Figure 14:
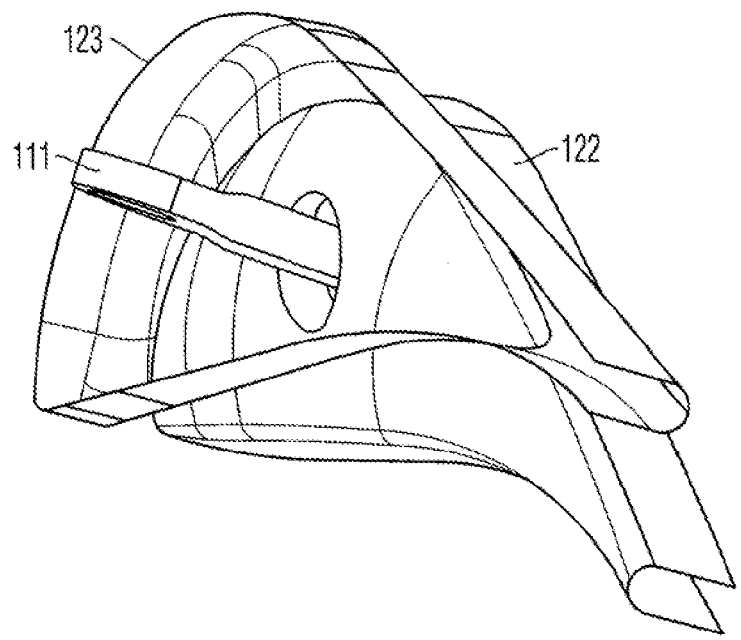
FIG. 14 shows the sealing and the additional rod from FIG. 13, wherein one flap is extended and the other flap is partially retracted.
Figure 15:
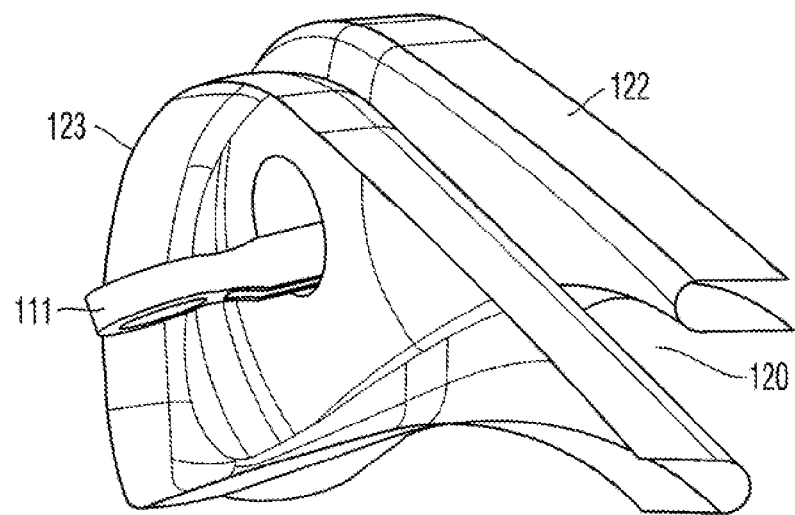
FIG. 15 shows the view from FIG. 14, wherein the flaps have an opposite orientation as compared to FIG. 14.

FIGS. 13, 14 and 15 show a further preferred embodiment of the invention. The gap 120 as illustrated in FIG. 12 is closed by means of a sealing 121 indicated in the embodiment according to the FIGS. 13 to 15. The sealing 121 has a first component 121 attached to the side 115 of the inner flap 2 and a second component 123 attached to the side 113 of the outer flap 3. The first and second component 122 and 123 are in sliding contact with one another by means of contacting surfaces 124 and 125 respectively.

Even if the flaps 2, 3 have different relative positions, for instance as shown in FIG. 14, wherein the outer flap is in a more retracted position than the inner flap 2 or as illustrated in FIG. 15, wherein the outer flap 3 is in a more extended position than the inner flap 2, the gap 120 is still at least partially closed. Preferably, one of the components 122, 123 is made of a stiff material, even more preferably of an elastic material, and the other component 122, 123 is made of a stiff material. In this way, a tight seal is achieved and substantially no air can pass through the gap 120.

This sealing 121, in particular the first and second component 122 and 123 have apertures generally indicated by the reference numeral 126 to allow the rod 111 to pass through. However, the sealing 123 can also be applied to a gap 120, which does not have a rod 111 connecting the two flaps 2 and 3.

Although the present invention has been described with reference to preferred embodiments, it is not restricted to them but rather can be modified in diverse ways.

The invention provides an aircraft comprising a fuselage, an airfoil mounted to the fuselage and a flap for steering the aircraft. Furthermore, connecting means articularly connect the flap to the airfoil such that the flap is allowed to rotate around a rotation axis substantial parallel to the trailing or leading edge of the airfoil between a retracted position and an extended position and to translate in a direction substantially parallel to the rotation axis. A rod articularly connects the flap to the airfoil or to the fuselage, wherein the rod defines the translation of the flap in the direction parallel to the rotation axis. Hence, by way of the invention forces acting of the flap in a direction parallel to the rotation axis can be taken up by the rod. Consequently, there is no need for using locating bearings having negative aerodynamic effects due to their by comparison large dimensions in a direction substantially perpendicular to the direction of flight of the aircraft.

The invention claimed is:

1. Aircraft, comprising:
   a fuselage;
   an airfoil mounted to the fuselage;
   a flap for steering the aircraft;
   connecting means articulately connecting the flap to the airfoil such that the flap is allowed to rotate around a rotation axis, which is stationary with respect to the airfoil and substantially parallel to the trailing or leading edge of the airfoil, between a retracted position and an extended position and to translate in a direction substantially parallel to the rotation axis; and
   a rod articulately connecting the flap to the airfoil or to the fuselage, wherein the rod defines the translation of the flap in the direction parallel to the rotation axis.

2. Aircraft according to claim 1, wherein the rod is configured such that the flap translates in the direction parallel to the rotation axis as the flap is rotated between its retracted position and its extended position.

3. Aircraft according to claim 1, wherein the rod extends substantially parallel to the rotation axis in the retracted position of the flap and forms an angle with the rotation axis in the extended position of the flap.

4. Aircraft according to claim 1, wherein the rod has an articulate joint connecting it to the leading edge, trailing edge or one of the sides of the flap at its one end and an articulate joint connecting it to the airfoil or to the fuselage at its other end.

5. Aircraft according to claim 4, wherein the articulate joint at the other end of the rod connecting the rod to the airfoil is fixedly attached to the rear spar or front spar of the airfoil by means of a plurality of struts.

6. Aircraft according to claim 5, wherein adjacent struts are arranged in a V-shape.

7. Aircraft according to claim 1, wherein the connecting means comprise at least two levers spaced apart from each other along the rotation axis and articulately connecting the flap to at least one of the airfoil and the fuselage.

8. Aircraft according to claim 7, wherein at least one of the levers is triangular in shape having an articulate joint at its one corner connecting it to the airfoil and a hinge joint along the side opposing the articulate joint connecting it to the flap.

9. Aircraft according to claim 7, wherein at least one of the levers has an articulate joint to the fuselage at its one end and an articulate joint to a trunnion fixed to the flap at its other end, wherein the trunnion is non-rotatably fixed to the lever in a plane substantially perpendicular to the rotation axis.

10. Aircraft according to claim 9, wherein the rod has an articulate joint connecting it to the trunnion of the flap at its one end and an articulate joint connecting it to the fuselage at its other end.

11. Aircraft according to claim 7, wherein the airfoil has at least one support beam attached to it, wherein an end section of the support beam extends away from the airfoil and wherein at least one of the levers has an articulate joint connecting it to the end section.

12. Aircraft according to claim 7, wherein the at least one support beam extends in the direction of flight of the aircraft.

13. Aircraft according to claim 7, wherein the airfoil has for at least part of its length a trailing or leading edge extending at an angle not equal to 90° with respect to the direction of flight.

14. Aircraft according to claim 11, wherein an actuator is mounted to the support beam, the actuator having a linkage connected to the flap, the linkage being extendible substantially in the plane of the support beam to operate the flap between its retracted position and its extended position.

15. Aircraft according to claim 14,
wherein the actuator is configured as a spindle drive or a lever arm drive.

16. Aircraft, comprising:
a fuselage;
an airfoil mounted to the fuselage;
a flap for steering the aircraft;
at least two levers spaced apart from each other along a rotation axis and articulately connecting the flap to at least one of the airfoil and the fuselage such that the flap is allowed to rotate around the rotation axis substantially parallel to the trailing or leading edge of the airfoil between a retracted position and an extended position and to translate in a direction substantially parallel to the rotation axis; and
a rod articulately connecting the flap to the airfoil or to the fuselage,
wherein the rod defines the translation of the flap in the direction parallel to the rotation axis.

17. Aircraft according to claim 16, wherein at least one of the levers is triangular in shape having an articulate joint at its one corner connecting it to the airfoil and a hinge joint along the side opposing the articulate joint connecting it to the flap.

18. Aircraft according to claim 16, wherein at least one of the levers has an articulate joint to the fuselage at its one end and an articulate joint to a trunnion fixed to the flap at its other end, wherein the trunnion is non-rotatably fixed to the lever in a plane substantially perpendicular to the rotation axis.

19. Aircraft according to claim 18, wherein the rod has an articulate joint connecting it to the trunnion of the flap at its one end and an articulate joint connecting it to the fuselage at its other end.

20. Aircraft according to claim 16, wherein the airfoil has at least one support beam attached to it, wherein an end section of the support beam extends away from the airfoil and wherein at least one of the levers has an articulate joint connecting it to the end section.

21. Aircraft according to claim 16, wherein the at least one support beam extends in the direction of flight of the aircraft.

22. Aircraft according to claim 16, wherein the airfoil has for at least part of its length a trailing or leading edge extending at an angle not equal to 90° with respect to the direction of flight.

23. Aircraft according to claim 22, wherein an actuator is mounted to the support beam, the actuator having a linkage connected to the flap, the linkage being extendible substantially in the plane of the support beam to operate the flap between its retracted position and its extended position.

24. Aircraft according to claim 23, wherein the actuator is configured as a spindle drive or a lever arm drive.

\* \* \* \* \*